(12) United States Patent
Chong et al.

(10) Patent No.: US 8,019,787 B2
(45) Date of Patent: Sep. 13, 2011

(54) RELATIONSHIP BASED TREE STRUCTURE WITH SCOPED PARAMETERS

(75) Inventors: Jackie Li Chong, Ontario (CA); Jamie J. Gilgen, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/044,282

(22) Filed: Mar. 7, 2008

(65) Prior Publication Data

US 2009/0228500 A1 Sep. 10, 2009

(51) Int. Cl.
*G06F 17/30* (2006.01)
(52) U.S. Cl. .................. 707/797; 707/791; 707/796
(58) Field of Classification Search .................. 707/791, 707/797, 796
See application file for complete search history.

(56) References Cited

U.S. PATENT DOCUMENTS

| | | | |
|---|---|---|---|
| 6,633,886 B1 | 10/2003 | Chong | |
| 6,751,622 B1 | 6/2004 | Puri et al. | |
| 7,305,485 B2 * | 12/2007 | Chang et al. | 709/232 |
| 7,620,646 B1 * | 11/2009 | Chai | 707/999.101 |
| 2003/0188292 A1 | 10/2003 | Herkert | |
| 2005/0086384 A1 * | 4/2005 | Ernst | 709/248 |
| 2005/0097108 A1 * | 5/2005 | Wang et al. | 707/100 |
| 2006/0041661 A1 * | 2/2006 | Erikson et al. | 709/225 |
| 2007/0016862 A1 * | 1/2007 | Kuzmin | 715/700 |
| 2007/0130133 A1 * | 6/2007 | Lee et al. | 707/4 |
| 2007/0162477 A1 * | 7/2007 | Chai | 707/101 |
| 2007/0220420 A1 * | 9/2007 | Sanders | 715/513 |
| 2008/0019499 A1 * | 1/2008 | Benfield et al. | 379/221.15 |

FOREIGN PATENT DOCUMENTS

EP 1316879 A2 6/2003

* cited by examiner

*Primary Examiner* — Rehana Perveen
*Assistant Examiner* — Thuy (Tiffany) Bui
(74) *Attorney, Agent, or Firm* — Sughrue Mion, PLLC (57) ABSTRACT

A system and method of storing information about tree structures. The method includes, for each given tree, identifying the nodes and the relationships between the nodes, and for each parameter, if more than one node of any of the given tree shares the parameter, then defining a scoping for the parameter to cover all of the nodes to which the parameter is applicable. The scoping includes applying one or more scope types having a varying specificity. The resulting information stored about the tree structure is substantially reduced in size in comparison to information about tree structures stored in a conventional manner, thereby reducing storage space requirements.

13 Claims, 5 Drawing Sheets

RELATIONSHIP BASED TREE STRUCTURE WITH SCOPED PARAMETERS

BACKGROUND

Almost all organizations require a way to store information, a popular data structure being a tree structure to store and create relationships between the information. However, the problem with most tree structures is that when two nodes of the tree are in multiple locations of that tree, the tree structure dictates the need for two separate instances of that node. Also, the information contained within the nodes is normally statically linked to that particular node. This results in a structure which is space inefficient and in which it may be difficult to manipulate node-common information.

SUMMARY

The present invention relates to a system and method for storing information for a tree structure more efficiently.

In an aspect, there is provided a method of storing information about tree structures, comprising: for each given tree, identifying the nodes and the relationships between the nodes; for each parameter, if more than one node of any of the given tree shares the parameter, then defining a scoping for the parameter to cover all of the nodes to which the parameter is applicable.

In an embodiment, the scoping comprises applying one or more scope types having a varying specificity.

In another embodiment, the one or more scope types may be: a scope based on the database table that information is stored in; the name of a node; the type of a node; a parent node; a particular branch of the tree; or an exact match of a pathway to a specific node.

In another embodiment, the method further comprises assigning each scope type a scope priority value.

In another embodiment, the method further comprises: if there is more than one parameter value associated with a node, then determining the parameter value having scoping with the most specificity; and presenting that parameter value in response to a query.

In another embodiment, the method further comprises: storing a parameter and a corresponding scoping together.

In another embodiment, the method further comprises: updating a parameter value for all nodes that share the parameter by changing the parameter value for a defined scoping.

In another aspect, there is provided a system for storing information about tree structures, comprising: means for identifying the nodes and the relationships between the nodes for each given tree; means for defining for each parameter, if more than one node of any of the given tree shares the parameter, a scoping for the parameter to cover all of the nodes to which the parameter is applicable.

In an embodiment, the system is adapted to apply one or more scope types having a varying specificity.

In another embodiment, the one or more scope types may be: a scope based on the database table that information is stored in; the name of a node; the type of a node; a parent node; a particular branch of the tree; or an exact match of a pathway to a specific node.

In another embodiment, the system further comprises means for assigning each scope type a scope priority value.

In another embodiment, the system further comprises: means for determining the parameter value having scoping with the most specificity if there is more than one parameter value associated with a node; and means for presenting that parameter value in response to a query.

In another embodiment, the system further comprises means for storing a parameter and a corresponding scoping together.

In another embodiment, the system further comprises means for updating a parameter value for all nodes that share the parameter by changing the parameter value for a defined scoping.

In another aspect, there is provided a data processor readable medium storing data processor code that when loaded onto a data processing device adapts the device to store information about tree structures, the data processor readable medium comprising: code for identifying, for each given tree, the nodes and the relationships between the nodes; code for defining for each parameter, if more than one node of any of the given tree shares the parameter, a scoping for the parameter to cover all of the nodes to which the parameter is applicable.

In an embodiment, the data processor readable medium further comprises code for applying one or more scope types having a varying specificity.

In another embodiment, the one or more scope types may be: a scope based on the database table that information is stored in; the name of a node; the type of a node; a parent node; a particular branch of the tree; or an exact match of a pathway to a specific node.

In another embodiment, the data processor readable medium further comprises code for assigning each scope type a scope priority value.

In another embodiment, the data processor readable medium further comprises: code for determining the parameter value having scoping with the most specificity if there is more than one parameter value associated with a node; and code for presenting that parameter value in response to a query.

In another embodiment, the data processor readable medium further comprises code for storing a parameter and a corresponding scoping together.

In another embodiment, the data processor readable medium further comprises code for updating a parameter value for all nodes that share the parameter by changing the parameter value for a defined scoping.

These and other aspects of the invention will become apparent from the following more particular descriptions of exemplary embodiments.

BRIEF DESCRIPTION OF THE DRAWINGS

In the figures which illustrate exemplary embodiments of the invention.

DETAILED DESCRIPTION

As noted above, the present invention relates to a system and method for storing information for a tree structure more efficiently.

Figure 1:
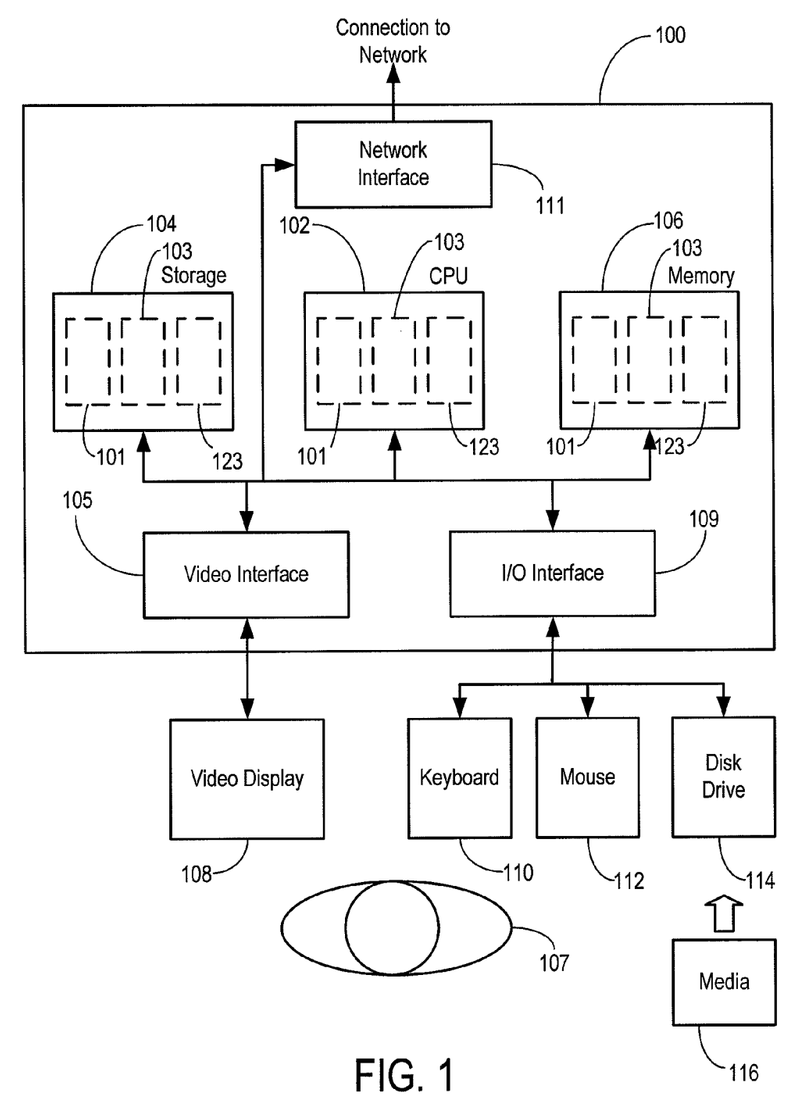
FIG. 1 shows a generic data processing system that may provide a suitable operating environment.

The invention may be practiced in various embodiments. A suitably configured data processing system, and associated communications networks, devices, software and firmware may provide a platform for enabling one or more embodiments. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

As an illustrative example, take a situation of a tree in which one would like certain information to apply only to a particular subset of the nodes. In a regular tree, one would need to have the same information duplicated across all the nodes of the subset. Any change would have to be propagated to all nodes affected, leading to the possibility of data inconsistencies and inefficiency.

A solution is required which allows one to have a large number of nodes which can be linked together to form a tree structure, and still be able to apply information in an efficient manner.

As will now be explained in more detail, the solution to the problem of storing information in a tree structure more efficiently, as presently proposed, is to keep the nodes of a tree structure generic. Node specific information may then be pushed out into what the inventors will define as a "parameter"—that is, a "parameter" is simply a piece of information. Closely related to parameters is what the inventors will refer to as "scoping"—a term that will be used to refer to a set of nodes to which a given parameter applies. The relationships between nodes may also be stored and connected externally to the node in a separate entity, which the inventors will refer to as a "relationship".

Different types of scopes having a varying specificity may be used. For example, the following six illustrative scopes have been used by the inventors in an implementation of the invention:

PARAM_TABLE—Scope based on the table we store the information in.
CONTAINER_NAME—The name of the node. "For all nodes called . . . "
CONTAINER_TYPE—The type of node it is. "For all nodes of type . . . "
PARENT—Based on the direct relationship of a node. For example, A→B→C, A is the parent of B, B is the parent of C. "For all nodes where the parent node is . . . "
SUBTREE—Based on a particular branch of the tree. For example, A→B→C, If subtree=A→B→C, the subtree could be read as "For all nodes that start with A→B→C . . . "
PATHWAY—Based on an exact match to the pathway to a specific node. For example, "For only node A→B→C . . . "

With the above six scopes, several levels of scoping can be defined by combining them together. For example, "for all nodes called x AND where they start with a pathway of A->B->C".

In an embodiment, the different types of scopes may be given a specific priority value. For example, for the above six scopes, the following priority values may be assigned: CONTAINER_13 TYPE—2; PARENT—4; SUBTREE—8; CONTAINER_NAME—16; PATHWAY—32. If there is more than one value associated with a parameter for a given node, then the scope priority value may determine which parameter value is made available upon conducting a search.

As an illustrative example, suppose there are three phone numbers for a John Smith in the database: (1) Someone named John Smith has a phone number of 555-1111 (CONTAINER_NAME=16); (2) A John Smith in the London phone book has a phone number of 555-2222 (CONTAINER_NAME+London subtree=16+8=24); (3) A John Smith in the Toronto phone book has a phone number of 555-3333 (CONTAINER_NAME+Toronto subtree=16+8=24). When configured this way, one could ask the system the following questions.

Q1. I know a John Smith in Toronto, what's his phone number? (find CONTAINER_NAME=John Smith AND subtree is Toronto). The system finds: 555-1111 with a priority value of 16, and 555-3333 with a priority value of 24. London is not here because it did not match the question. When given these two potentially matching phone numbers, the system returns: 555-3333 because it has a higher scope priority value.

Q2. I know a John Smith in Montreal, what's his phone number? (find CONTAINER_NAME=John Smith AND subtree is Montreal). The system finds: 555-1111 with a priority value of 16. Again, London is not here because it did not match the question. Toronto is not here because it did not match the question. The system finally returns: 555-1111 because it has the highest scope priority value of the items found.

In summary, what is proposed is the use of four distinct entities in the representation of a tree in accordance with the present invention, namely: (1) nodes; (2) parameters; (3) scoping; and (4) relationships. More generally, the present approach moves away from parameters and scoping being statically node specific, and instead introducing the flexibility to apply a parameter to a wide range of nodes at the same time, and defining the applicability of the parameter using scoping. Any change to the parameter is then instantly visible to any node currently part of that defined scope.

Also, the nodes are now no longer tied to a specific tree. Rather, one can have the same node in two trees sharing some information, such as perhaps "node_name", while at the same time having some information unique to it's location in each tree such as "version_number". Traditional tree structures do not allow this level of flexibility. These concepts will now be described in more detail.

As used in the present description, a "node" is a piece of information which can be connected to another node via a "relationship" or a "pathway". Thus, a tree structure in accordance with an embodiment of the present invention stores "nodes" and "relationships" as separate objects. This is in contrast to conventional tree structures which store references to other nodes as part of the node itself, which is fairly inflexible. Storing relationships or pathways outside of the node, as is the case in the present invention, allows one to have virtually an infinite number of inter-nodal pathways.

Figure 2A:
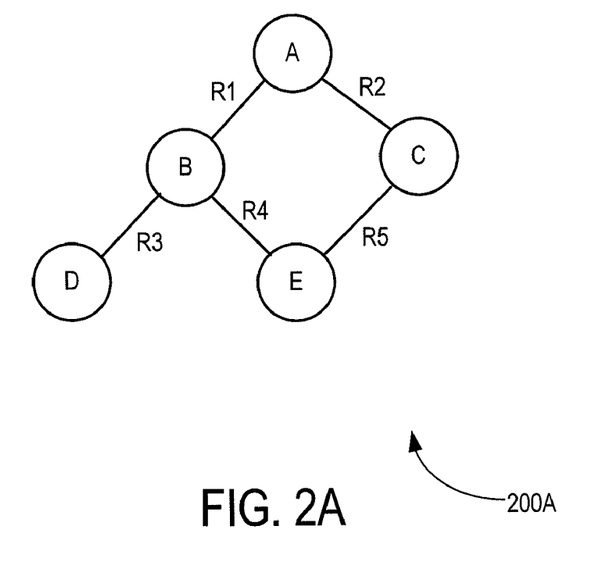
FIGS. 2A and 2B show illustrative examples of a tree representation of information.
Figure 2B:
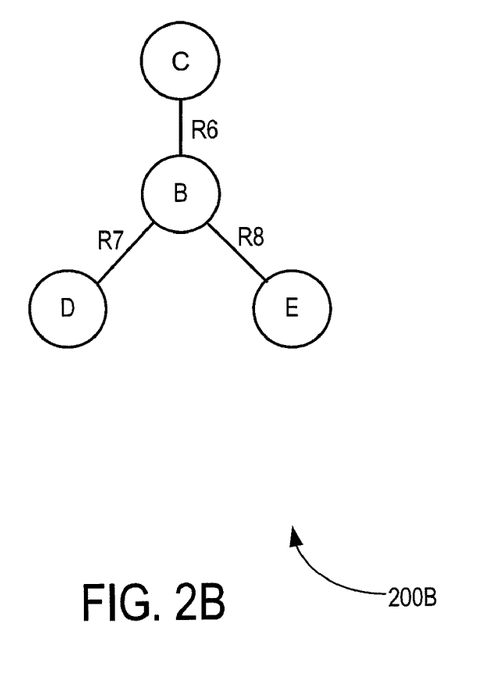

As an illustrative example, referring to FIG. 2A and FIG. 2B, assume that there are two trees 200A and 200B in which A, B, C, D, and E are "nodes" and R1, R2, R3, R4, R5, R6, R7, R8 are "relationships" or "pathways". Notice that there are two instances of nodes B, C, D and E. Conventionally, these trees would be described as distinct trees having static relationships between the nodes and the pathways.

Figure 3:
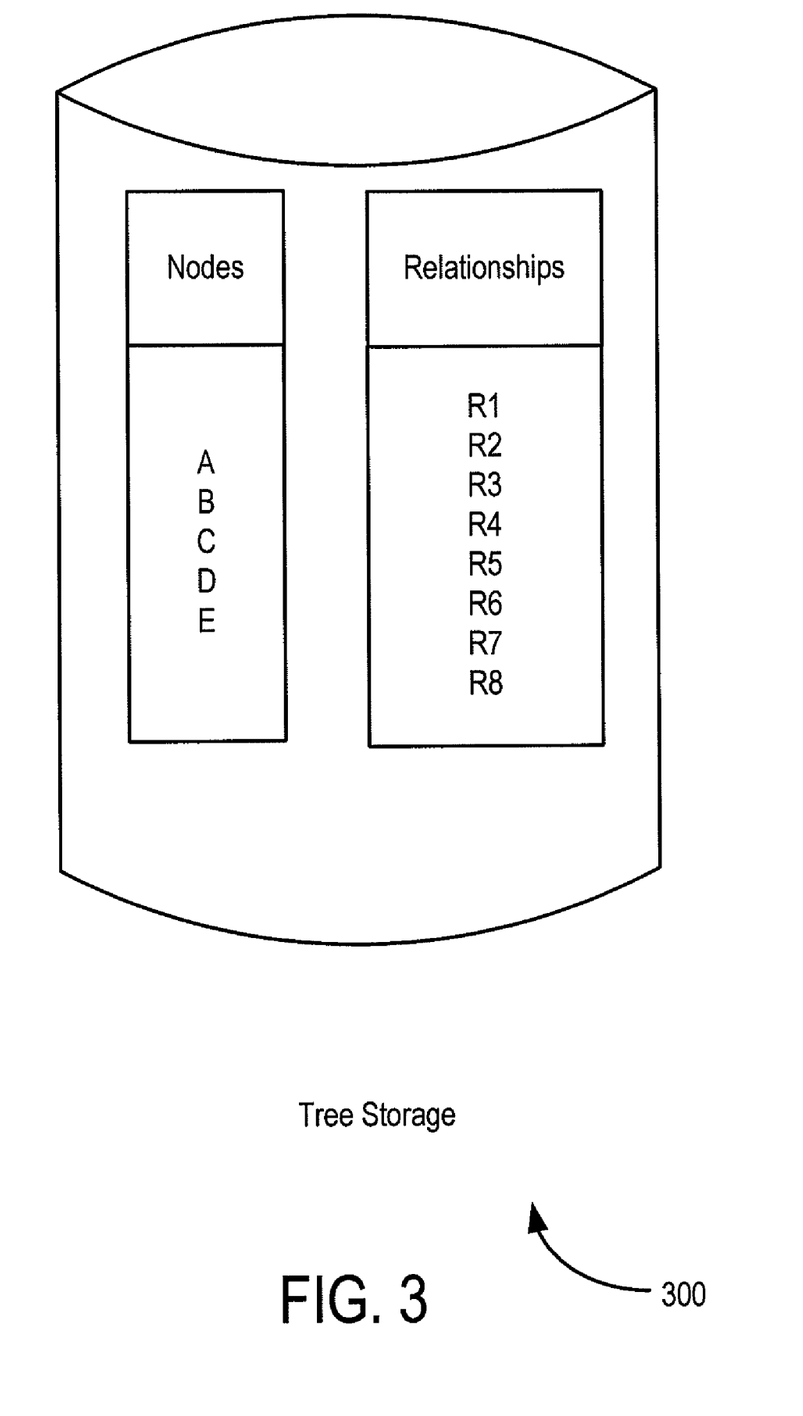
FIG. 3 shows an illustrative tree storage structure in accordance with an embodiment.

However, in accordance with an embodiment of the present invention, as shown in FIG. 3, the trees 200A and 200B may be stored in a tabular manner using a nodes table referencing nodes A, B, C, D and E, and a corresponding relationships table with information about each of the relationships R1, R2, R3, R4, R5, R6, R7, R8. This means that, even though nodes B, C, D and E are in two different trees 200A and 200B, they are not duplicated in storage as separate trees. This is an immediate savings from a storage space perspective for representing multiple trees.

As used in the present disclosure, a "pathway" is an index into a specific node of a specific tree. For example: In tree 200A above, the pathway to "D" would be "A-B-D" and in Tree 200B it would be "C-B-D". A pathway is always unique, and multiple pathways can exist to a given node, such as node "E". For tree 200A, this would be "A-B-E", "A-C-E". For tree 200B, this would be "C-B-E". These pathways allow each instance of a node in a tree to be distinctly identified. This is important when it is desired to apply a parameter to a particular node.

One potential issue with the tree storage configuration shown in FIG. 3 is if node B, for example, needs to have different information in the two different trees 200A, 200B. As an illustrative example, consider the case where the two trees 200A and 200B represent phone books and "B" is a person who owns both a cottage and a house. In this case, "B" may have an entry in both of the phone books 200A, 200B yet may have a different residential phone number at the cottage and the house. In a traditional tree structure, "B" would be a separate instance of a node, and therefore this wouldn't be an issue. However, in the tree structure representation in accordance with the present invention, there needs to be a way to store information dependant upon a node's particular location in a given tree. The solution to this issue is what the inventors have termed "parameters".

As used in the present disclosure, and as previously mentioned, a "parameter" is a piece of information, and a "scope" is a set of nodes to which a given parameter applies. Some illustrative examples of "scope" are:
(1) A subtree: Parameter applies to all children and sub children of a specific node in a tree.
(2) A node: Parameter applies to all instance of a particular node.
(3) A combination of scopes: More than one scoping could be applied, for example, one could have a parameter which applies to all nodes of a certain type in a certain subtree.

In a normal tree structure, a piece of information which is to be part of every node in a tree requires O(n) storage space. [As will be appreciated by those skilled in the art, the O(n) function in the field of computer science is a function which converts the computational complexity of an algorithm into a mathematical function. This allows for the comparison of the efficiency of computational algorithms against one another. In the current example, O(n) refers to a number of nodes as a function of disk space. From this one can draw a graph to illustrate, where O(n) can be seen as f(x)=x where as O(1) is f(x)=1. Here, f(x)=1 is the simple case of one parameter that is exactly the same for every node. If we needed to store different values for different instances of the node, it would be f(x)=d, where d is the number of different values the parameter has. The worst case scenario where each instance has a unique value is f(x)=x, the same as a regular tree.] However, using parameters and scopes in accordance with the present invention, the storage space is only O(1). The same improvement applies to modifications as well. For example, an alteration of a piece of information present in all nodes in a traditional tree is O(n), yet this alteration is only O(1) with the tree in accordance with the present invention.

In addition to improved efficiencies in storage space, the modified tree representation of the present invention may also have significant performance benefits. For example, assume there is a tree with 1000 nodes, and there is a piece of information present in all the nodes such as "City=Toronto". If one wanted to change the information to "City=London" and changing 1 node took 10 ms, then 1000 nodes*10 ms/node=10 seconds. However, if the same information is now represented in a tree structure in which parameters and scoping are being used, then "City=Toronto" can be scoped so that it applies to all nodes in a given tree. Therefore, changing that one parameter to "City=London" will result in changing the information for all 1000 nodes in a single operation: parameter*10 ms/parameter=0.01 seconds. This results in a 1000× performance increase in comparison to the traditional tree structure.

Figure 4:
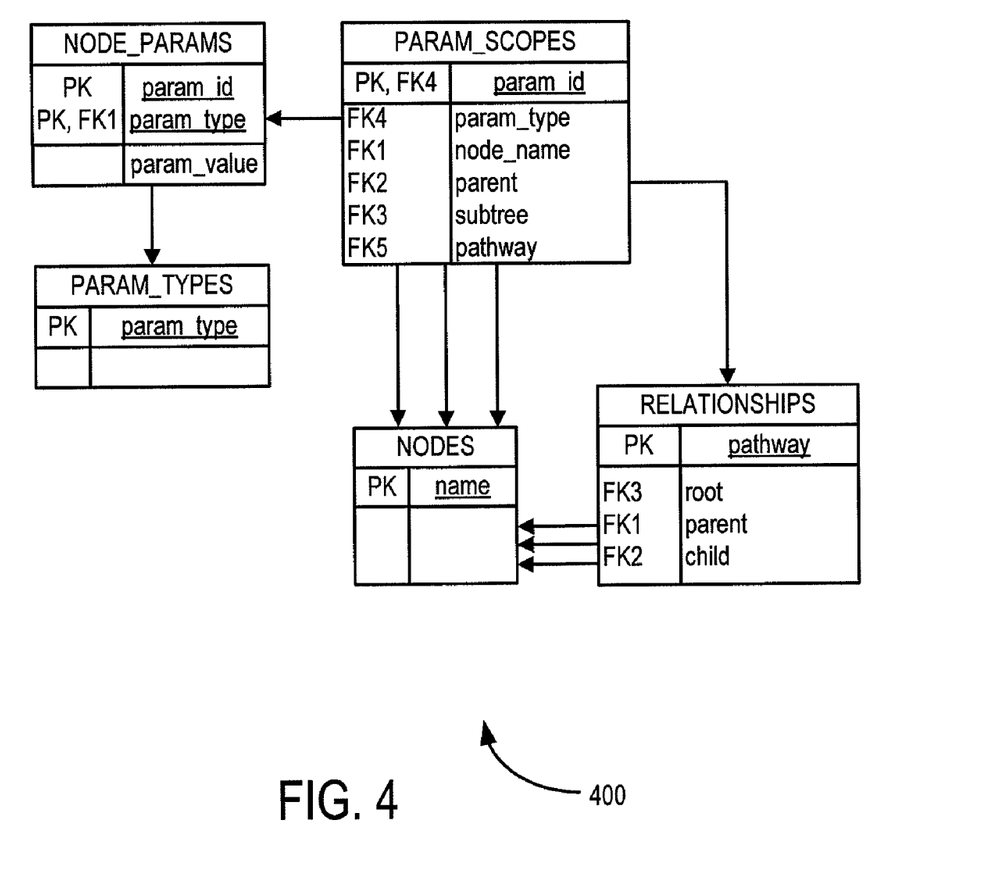
FIG. 4 shows a block diagram of an illustrative database schema of a tree in accordance with an embodiment.

Now referring to FIG. 4, in order to store the tree in accordance with the present invention along with the parameters and scoping, one could use the simplified database schema as shown. In this illustrative example, FIG. 4 represents the storage of the parameters and their scoping. Relationships are not represented here, except for a reference in the scopes table. Basically, FIG. 4 shows that the value of a parameter ("param_value") is stored separately from the information that is used to link it to the tree ("PARAM_SCOPES") as well as the nodes ("NODES").

Figure 5:
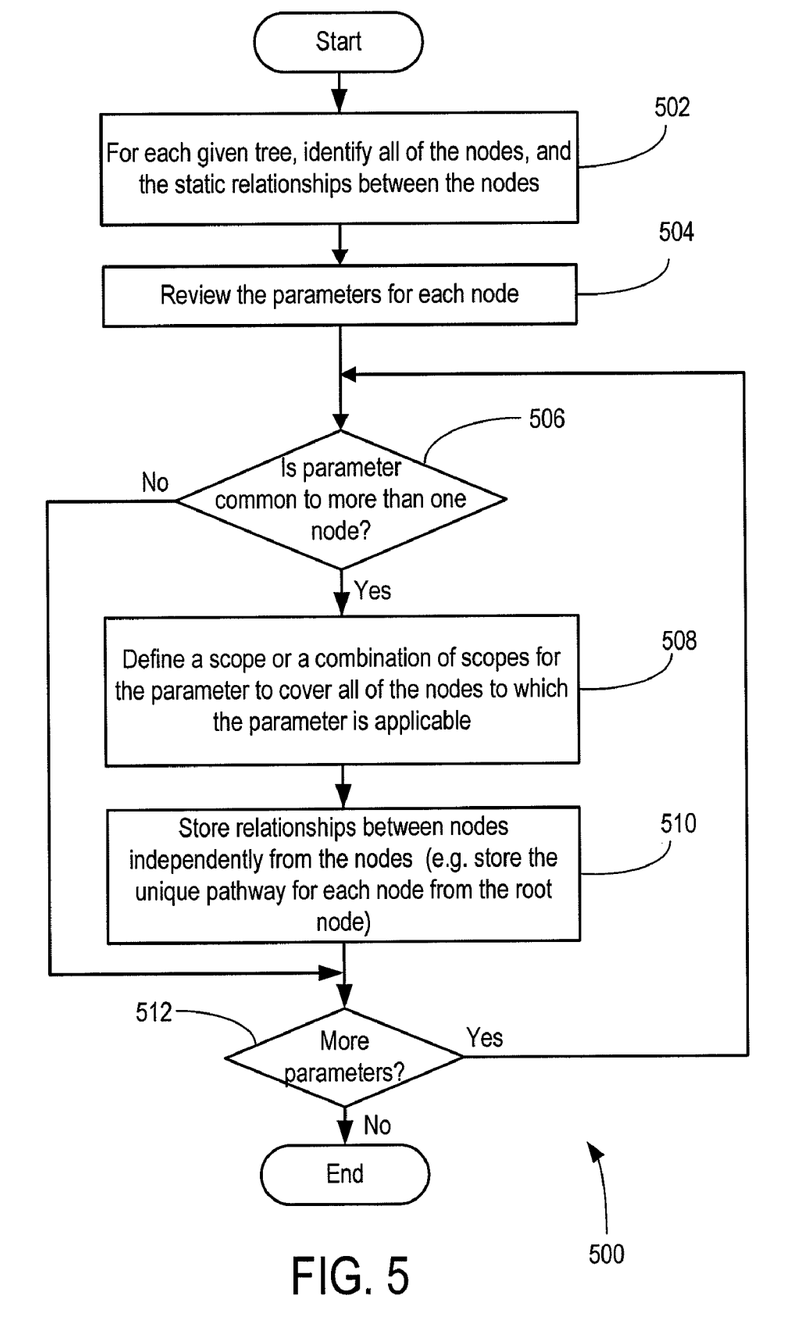
FIG. 5 shows a method in accordance with an embodiment.

Now referring to FIG. 5, shown is a schematic flowchart of a method 500 in accordance with an embodiment. Method 500 begins and at block 502, and for each given tree identifies the nodes, and the relationships between the nodes.

Method 500 then proceeds to block 504, where method 500 determines if a parameter is common to more than one node of any of the given trees is identified.

Next, method 500 proceeds to block 506, where method 500 defines a scope for the parameter identified in block 504, to cover all of the nodes to which the parameter is applicable.

Method 500 then proceeds to block 508, where relationships between the various nodes are stored independently from the nodes. For example, a pathway from a root node to any other node in the tree may be uniquely defined and stored.

Method 500 then proceeds to block 510, where method 500 determines of there are any additional parameters in any of the given trees. At decision block 512, if there are additional parameters, method 500 may continue and return to block 504 to repeat. If no, method 500 may end.

While various illustrative embodiments of the invention have been described above, it will be appreciated by those skilled in the art that variations and modifications may be made. Thus, the scope of the invention is defined by the following claims.

What is claimed is:

1. A computer-implemented method of storing information about tree structures, comprising:
for each given tree, identifying nodes and relationships between the nodes, each of the identified nodes including one or more parameters;
for each parameter of the identified nodes, if more than one node of any of the given tree shares the parameter, then defining a scoping for the parameter to cover all of the nodes to which the parameter is applicable;

applying, to each node covered by the defined scoping, one or more scope types having a varying specificity, the varying specificity identifying whether a node, among the nodes covered by the scoping, should be updated depending upon a location of the node in the given tree;

assigning each scope type a scope priority value;

receiving a query related to the shared parameter for which the scoping is defined;

if the shared parameter has more than one parameter value assigned to the nodes covered by the scoping, then determining a parameter value assigned to a node, from among the nodes covered by the scoping, having a highest scope priority value based on the one or more scope types applied to the nodes and the corresponding scope priority value assigned to the one or more scope types; and presenting the determined parameter value with the highest scope priority value in response to the query.

2. The method of claim 1, wherein the one or more scope types may be: a scope based on a database table that information is stored in; the name of a node; the type of a node; a parent node; a particular branch of the tree; or an exact match of a pathway to a specific node.

3. The method of claim 2, further comprising:

storing a parameter and a corresponding scoping together.

4. The method of claim 3, further comprising:

updating a parameter value for all nodes that share the parameter by changing the parameter value for the defined scoping.

5. A system for storing information about tree structures, comprising:

means for identifying nodes and relationships between the nodes for each given tree, each of the identified nodes including one or more parameters;

means for defining for each parameter of the identified nodes, if more than one node of any of the given tree shares the parameter, a scoping for the parameter to cover all of the nodes to which the parameter is applicable, wherein the system is adapted to apply, to each node covered by the defined scoping, one or more scope types having a varying specificity, the varying specificity identifying whether a node, among the nodes covered by the scoping, should be updated depending upon a location of the node in the given tree;

means for assigning each scope type a scope priority value;

means for receiving a query related to the shared parameter for which the scoping is defined;

means for determining, if the shared parameter has more than one parameter value assigned to the nodes covered by the scoping, a parameter value assigned to a node, from among the nodes covered by the scoping, having a highest scope priority value based on the one or more scope types applied to the nodes and the corresponding scope priority value assigned to the one or more scope types; and means for presenting the determined parameter value with the highest scope priority value in response to the query.

6. The system of claim 5, wherein the one or more scope types may be: a scope based on a database table that information is stored in; the name of a node; the type of a node; a parent node; a particular branch of the tree; or an exact match of a pathway to a specific node.

7. The system of claim 6, further comprising:

means for storing a parameter and a corresponding scoping together.

8. The system of claim 7, further comprising:

means for updating a parameter value for all nodes that share the parameter by changing the parameter value for the defined scoping.

9. A data processor readable medium storing data processor code that when loaded onto a data processing device adapts the device to store information about tree structures, the data processor readable medium comprising:

code for identifying, for each given tree, nodes and relationships between the nodes, each of the identified nodes including one or more parameters;

code for defining for each parameter of the identified nodes, if more than one node of any of the given tree shares the parameter, a scoping for the parameter to cover all of the nodes to which the parameter is applicable;

code for applying, to each node covered by the defined scoping, one or more scope types having a varying specificity, the varying specificity identifying whether a node, among the nodes covered by the scoping, should be updated depending upon a location of the node in the given tree;

code for assigning each scope type a scope priority value;

code for receiving a query related to the shared parameter for which the scoping is defined;

code for determining, if the shared parameter has more than one parameter value assigned to the nodes covered by the scoping, a parameter value assigned to a node, from among the nodes covered by the scoping, having a highest scope priority value based on the one or more scope types applied to the nodes and the corresponding scope priority value assigned to the one or more scope types; and code for presenting the determined parameter value with the highest scope priority value in response to the query.

10. The data processor readable medium of claim 9, wherein the one or more scope types may be: a scope based on a database table that information is stored in; the name of a node; the type of a node; a parent node; a particular branch of the tree; or an exact match of a pathway to a specific node.

11. The data processor readable medium of claim 10, further comprising:

code for storing a parameter and a corresponding scoping together.

12. The data processor readable medium of claim 11, further comprising:

code for updating a parameter value for all nodes that share the parameter by changing the parameter value for the defined scoping.

13. A system for storing information about tree structures, comprising:

a hardware processor connected to a memory;

an identifying module, executed on the hardware processor, which identifies nodes and relationships between the nodes for each given tree, each of the identified nodes including one or more parameters;

a defining module which defines, for each parameter of the identified nodes, if more than one node of any of the given tree shares the parameter, a scoping for the parameter to cover all of the nodes to which the parameter is applicable, the defined scoping stored in the memory;

an applying module which applies, to each node covered by the defined scoping, one or more scope types having a varying specificity, the varying specificity identifying whether a node, among the nodes covered by the scoping, should be updated depending upon a location of the node in the given tree;

as assigning module which assigns each scope type a scope priority value;

a receiving module which receives a query related to the shared parameter for which the scoping is defined;

a determining module which determines, if the shared parameter has more than one parameter value assigned to the nodes covered by the scoping, a parameter value assigned to a node, from among the nodes covered by the scoping, having a highest scope priority value based on the one or more scope types applied to the nodes and the corresponding scope priority value assigned to the one or more scope types; and a presenting module which presents the determined parameter value with the highest scope priority value in response to the query.

* * * * *